3,394,109
PROCESS FOR THE PRODUCTION OF COPOLYMERS OF TRIOXANE AND N-HETEROCYCLIC MONOMERS AND THE RESULTANT COPOLYMER
Wolfgang von der Emden and Ernst Ulrich Köcher, Leverkusen, Germany, assignors to Farbenfabriken Bayer Aktiengesellschaft, Leverkusen, Germany, a corporation of Germany
No Drawing. Filed Aug. 23, 1965, Ser. No. 481,889
Claims priority, application Germany, Nov. 28, 1964, F 44,566
13 Claims. (Cl. 260—67.6)

ABSTRACT OF THE DISCLOSURE

Copolymers having repeating units of —CH$_2$—O— interrupted by units having the formula

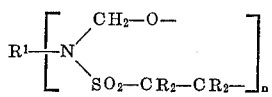

wherein R is hydrogen or lower alkyl, $n$ is 1 or 2, R$^1$ is alkyl or aryl when $n$ is 1 and R$^1$ is alkylene or arylene when $n$ is 2 and processes of producing such polymers.

---

Many methods are known for converting formaldehyde into linear polymers of different chain length. However, these polymers which are designated as polyoxymethylenes, are easily and quantitatively degraded by heat treatment back into monomeric formaldeyhde.

Trioxane, the cyclic trimer of formaldehyde, can also be polymerised under the action of cationic initiators to form linear polyoxymethylenes, which are likewise thermally unstable.

Thermostable polyoxymethylenes are obtained by etherification or esterification of the terminal hydroxyl groups of formaldehyde polymers. The introduction of terminal alkyl groups (etherification) is more difficult to carry out than acylation (esterification), but supplies products which, because of their pure polyacetal structure, have an excellent resistance to alkalis as well as an improved thermostability.

These polyoxymethylenes, the terminal groups of which have been modified, always still show too low a thermostability for technical requirements; oxygen and traces of acids cause the polyacetal chains to break and form new terminal hydroxyl groups on the fragments. These fragments are then completely degraded thermally.

Two methods are indicated to counteract this disadvantage. In the first place, the influences of oxygen and acids can be counteracted by additing stabilisers, which have some effect in preventing degradation. Carbonamides, sulphonamides, urethanes, carbodiimides, sulphur compounds and phenols are inter alia known as such stabilisers. Secondly, copolymers can be prepared from trioxane and cyclic acetals, ethers and lactones, these copolymers containing not only —CH$_2$—O— elements but also a small quantity of —CH$_2$—CH$_2$—O— elements. Once degradation of the chain has started, it comes to a stop at such an ethylene ether grouping. These copolymers are consequenty only sufficiently thermostable when they are degraded by heating to such a degree that a

—CH$_2$—CH$_2$—O— grouping is always situated at the ends of the polyoxymethylene chains.

A new process for the production of thermostable polyoxymethylenes has now been found, according to which trioxane is copolymerised in the presence of a cationically active initiator with 0.5 to 50 mol. percent of a compound of the general formula

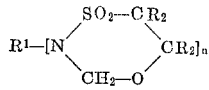

in which R represents a hydrogen atom or a lower alkyl radical, preferably a C$_1$ to C$_6$ alkyl radical (and advantageously represents hydrogen), R$^1$ represents a monovalent or divalent saturated aliphatic hydrocarbon or aromatic radical and $n$ is 1 or 2. Preferred radicals for R$^1$, when $n$ is 2, are alkylene radicals having 1 to 6 carbon atoms, phenylene radicals, lower alkyl substituted phenylene radicals and naphthylene radicals.

The polyoxymethylenes obtained in this process are novel compounds.

With this process, the monomer utilised is such that good thermostabilisation of the polyoxymethylene is obtained. The (—CH$_2$—O—)$_n$ chains of the polyoxymethylene are interrupted by

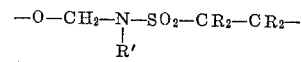

members, at which the degradation of the chain comes to a stop. These groups also cause the blocking of the terminal OH-groups of the polyoxymethylenes. The sulphonamide group contained in the residue also acts simultaneously as an additional stabiliser. Since this group is incorporated into the actual chain, it cannot be removed from the polymers, e.g. by heating or dissolving out, unlike the former additional stabilisers. The comonomers of this invention thus combine the action of stabilizers and the action of comonomers.

Co-monomers which are suitable for the process according to the invention are for example:

N-methyl-tetrahydro-1,4,5-oxathiazine-4,4-dioxide,
N-ethyl-tetrahydro-1,4,5-oxathiazine-4,4-dioxide,
N-propyl-tetrahydro-1,4,5-oxathiazine-4,4-dioxide,
N-butyl-tetrahydro-1,4,5-oxathiazine-4,4-dioxide,
N-(n-hexyl)-tetrahydro-1,4,5-oxathiazine-4,4-dioxide,
N-cyclohexyl-tetrahydro-1,4,5-oxathiazine-4,4-dioxide,
N-benzyl-tetrahydro-1,4,5-oxathiazine-4,4-dioxide,
N-phenyl-tetrahydro-1,4,5-oxathiazine-4,4-dioxide,
N-(p-nitrophenyl)-tetrahydro-1,4,5-oxathiazine-4,4-dioxide,
N-(p-toluyl)-tetrahydro-1,4,5-oxathiazine-4,4-dioxide,
N-(4'-nitro-3'-chlorophenyl)-tetrahydro-1,4,5-oxathiazine-4,4-dioxide,
N-naphthyl-tetrahydro-1,4,5-oxathiazine-4,4-dioxide,
1,2-bis-[tetrahydro-1,4,5-oxathiazine-4,4-dioxide] - ethane, and
1,4-bis-[tetrahydro-1,4,5-oxathiazine(4,4)dioxide]-butane.

These compounds can be prepared by known methods. The quantity of these comonomers to be introduced in the present process advantageously is in the range of 0.5 to 5 mol. percent based on the trioxane introduced, if the polymer is to have the properties of polyoxymethylenes. Larger quantities of comonomers, up to 50 mol. percent, can be used if it is desired to modify the properties of the polymer, for example to obtain a reduced melting point and lower degree of crystallisation, as well as an improved solubility in organic solvents.

As will as using strong acids such as H$_2$SO$_4$, HClO$_4$ or alkane-sulphonic acids and p-toluosulphonic acid as cationically active initiators, other compounds to be considered are these which are designated as Lewis acids, such as boron trifluoride, borontrichloride, aluminium trichloride, ferric chloride, antimonypentachloride, titanium tetrachloride and tin-tetrachloride, as well as the fluorides of the said metals or the addition compounds of boron trihalides (more especially boron trifluorides) with ethers, carboxylic acid esters and anhydrides, nitriles and carboxylic acid amides; also valuable are oxonium salts, such as triethyl oxonium fluoborate and carboxonium salts, such as diethoxycarbonium fluoborate and 2-methyl dioxolenium fluoborate. Fluoborates of aryldiazonium compounds, which are converted at elevated temperature into aryl cations with nitrogen being split off are likewise suitable.

The initiators are added to the polymerisation medium in quantities of 0.001 to 1% by weight, calculated on the weight of trioxane introduced.

The copolymerisation can be carried out as a block polymerisation, which takes place within a short time and with a practically quantitative yield. In such a case, the catalyst can be melted with the trioxane and the co-monomer can be added simultaneously, or first of all the trioxane can be melted with the co-monomer and then the catalyst introduced, possibly dissolved in an inert solvent. The polymerisation can also take place in suspension in an organic liquid, in which trioxane has only limited solubility. Suitable for such an arrangement are for example straight-chain aliphatic hydrocarbons with more than 8 carbon atoms or mixtures thereof, for example a $C_{12}$–$C_{18}$ fraction of the boiling range 230 to 320° C.

If the polymerisation takes place as solution polymerisation, the following solvents may for example be used:

Benzene, toluene, hexane, heptane, cyclohexane, isooctane, white spirit, hydrogenated trimeric isobutylene and chlorinated hydrocarbons.

The polymerisation according to the invention generally is carried out at temperatures of from 50 to 120° C. and advantageously at 70 to 110° C. It is often possible with advantage to work at about 70 to 85° C. It is also possible to work above or below the indicated temperature range in certain cases.

The copolymers are initially unstable and they must be freed completely from the acid catalyst or its residues; this can be effected by suspension in, for example, sodium hydroxide solution or organic bases, in water or in an alcohol, when suspending in a base, some of the terminal loosely-combined formaldehyde is simultaneously split off. However, this degradation generally does not take place completely at low temperatures. In order to reach maximum stability, the polymer freed from the catalyst must be heated for a short time (up to 30 minutes) to above its melting point.

Copolymers of different molecular weight range can be produced as desired, depending on the intended purpose of use. Copolymers of high molecular weight, the reduced viscosity of which is in the range of about 0.6 to 3.0, measured at 60° C. in a 0.5% solution of p-chlorophenol, are suitable for use as a thermoplastic material for the production of molded elements by injection moulding for the production of fibres by melt-spinning or dry-spinning. For the preparation of such copolymers, the quantity of the organonitrogen compound introduced advantageously is 0.5 to 5 mol percent, based on the trioxane introduced (calculated as $CH_2O$). Light stabilisers, dye-stuffs, pigments and possibly heat and oxidation stabilisers, fillers or plasticisers can for example be added to these polymers.

If the copolymers are to be used as intermediate products or auxiliaries in the plastics industry, lower molecular weights down to about 500 may also be desirable. In this case, higher proportions of the nitrogenous comonomers up to about 50 mol. percent based on monomeric formaldehyde, can also be used. The copolymers which are obtained in this case can have an oily or resinous consistency at room temperature. As the proportion of formaldehyde is increased, the crystallinity of the copolymers improves and the melting point rises.

Furthermore, it is possible still further to modify the properties of the copolymers by using in addition other comonomers, for examples of which are cationically polymerisable olefines or cyclic organic oxygen or sulphur compounds. Examples of these are styrene, acrylonitrile, ethylvinyl ether, methylvinyl sulphone or epoxy compounds such as ethylene oxide or propylene oxide, cyclic acetals and thioacetals such as 1,3-dioxolane or 1,3-oxthiolane, as well as organonitrogen comonomers, such as bis-(alkyl - sulphonyl) - imidazolidines, alkyl - sulphonyl oxazolidines and alkyl-sulphonyl thiazolidines.

The polymers prepared according to the invention are distinguished from homopolymers closed at the terminal groups and copolymers with oxygen-containing comonomers by the fact that, as well as the C—C-grouping forming the terminal groups, the molecules themselves also contain a sulphonamide group which acts as an additional stabiliser. The process according to the invention thus simplifies the preparation of thermostable polyoxymethylenes, and a further improvement in the thermostability simultaneously is obtained.

Example 1

0.5 ml. of a 10% solution of $BF_3$ etherate in ether is added at 70° C. to a mixture of 7.5 g. of N-(p-toluyl)-tetrahydro oxathiazinedioxide and 25 g. of trioxane. The melt initially becomes cloudy, then quickly becomes viscous and within 3 minutes is solid. It is kept for another hour at 70° C. then the hard block is comminuted and washed with acetone. Yield: 26 g. of a product having the intrinsic viscosity $\eta_i=0.672$, measured in 0.5% solution in p-chlorophenol at 60°. After treatment for 10 hours in boiling 5% aqueous sodium hydroxide solution, the product has an hourly loss of weight at 222° C. of 0.7%.

Example 2

0.5 ml. of a 10% solution of boron fluoride etherate in ether is added at 70° C. to a melt of 22.5 g. of trioxane and 1 g. of N-cyclohexyl tetrahydro oxathiazinedioxide. The mixture reacts thoroughly in 2 minutes to form a hard block, which is comminuted and washed with acetone. 23.5 g. of a polymer are obtained having an intrinsic viscosity of $\eta_i=0.432$, measured in 0.5% solution in p-chlorophenol at 60° C. After treatment for 10 hours in 5% sodium hydroxide solution under reflux, there are obtained 12 g. of stable product, which loses 1.0% of its weight hourly at 222° C.

We claim:

1. Process for preparing trioxane copolymers which comprises copolymerizing trioxane at a temperature of between 50 and 120 °C. in the presence of a cationically acting catalyst with 0.5 to 50 mol percent of a cyclic sulfonamide of the general formula

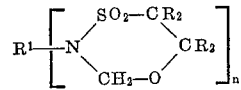

wherein R is hydrogen or lower alkyl, $n$ is 1 or 2, $R^1$ is alkyl or aryl when $n$ is 1 and $R^1$ is alkylene or arylene when $n$ is 2.

2. A process according to claim 1, wherein a further cyclic compound containing a ring member selected from the group consisting of oxygen, sulfur and nitrogen is concurrently used as an additional comonomer.

3. Process according to claim 1, wherein said cationically acting catalyst is a Lewis acid.

4. Process according to claim 1, wherein said cationically acting catalyst is selected from the group consisting of boron trifluoride and boron trifluoride adducts with diethyl ether, di-n-butylether, tetrahydrofuran and acetonitrile.

5. Process according to claim 1, wherein said cationically acting catalyst is a carboxonium salt.

6. Process according to claim 1, wherein said cationically acting catalyst is 2-methyl-1,3-dioxolenium fluoroborate.

7. Process for preparing trioxane copolymers which comprises copolymerizing trioxane at a temperature of between 50 and 120° C. in the presence of a cationically acting catalyst with 0.5 to 5 mol percent of a cyclic sulfonamide of the general formula

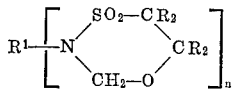

wherein R is hydrogen or lower alkyl, $n$ is 1 or 2, $R^1$ is alkyl or aryl when $n$ is 1 and $R^1$ is alkylene or arylene when $n$ is 2.

8. Process according to claim 1, wherein said cyclic sulfonamide is N-paratolyl-tetrahydro-oxathiazine dioxide or N-cyclohexyl-tetrahydro-oxathiazine dioxide.

9. A trioxane copolymer consisting essentially of repeating —$CH_2$—O— units interrupted by from 0.5 to 50 mol percent of units having the formula

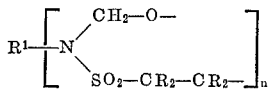

wherein R is hydrogen or lower alkyl, $n$ is 1 or 2, $R^1$ is alkyl or aryl when $n$ is 1 and $R^1$ is alkylene or arylene when $n$ is 2.

10. The copolymer of claim 9 wherein R is hydrogen, $R^1$ is para-tolyl and $n$ is 1.

11. The copolymer of claim 9 wherein R is hydrogen, $R^1$ is cyclohexyl and $n$ is 1.

12. Process according to claim 1, wherein $R^1$ is selected from the group consisting of alkylene having up to 6 carbon atoms, phenylene, lower alkyl substituted phenylene and naphthylene and $n$ is 2.

13. Copolymers of claim 9 wherein $R^1$ is selected from the group consisting of alkylene having up to 6 carbon atoms, phenylene, lower alkyl substituted phenylene and naphthylene and $n$ is 2.

References Cited

UNITED STATES PATENTS

| | | |
|---|---|---|
| 2,072,971 | 3/1937 | Walter. |
| 2,545,174 | 3/1951 | Sido. |
| 2,722,531 | 11/1955 | Ratz. |
| 3,304,287 | 2/1967 | Kiss. |

WILLIAM H. SHORT, *Primary Examiner.*

H. E. SCHAIN, *Assistant Examiner.*